United States Patent [19]
Latham et al.

[11] 3,753,737
[45] Aug. 21, 1973

[54] OMELET PREPARING AND PROCESS

[75] Inventors: S. Duane Latham; Robert D. Seeley, both of Crestwood; Henry F. Reitz; Ronald F. Reitz, both of St. Louis, all of Mo.

[73] Assignee: Anheuser-Busch, Incorporated, St. Louis, Mo.

[22] Filed: Oct. 12, 1970

[21] Appl. No.: 79,922

[52] U.S. Cl. .................................... 99/113, 99/373
[51] Int. Cl. ............................................... A23l 1/32
[58] Field of Search ..................... 99/113, 372, 373, 99/375, 376, 377, 384, 383, 424, 426, 430, 439

[56] References Cited
UNITED STATES PATENTS
1,010,887   12/1911   French ................................. 99/424
3,073,704   1/1963    Rivoche ............................... 99/113

OTHER PUBLICATIONS
Chamberlain, The Omelet Book, 1956, pp. 21, 32–33, Alfred A. Knopf, Inc.

Primary Examiner—Raymond N. Jones
Assistant Examiner—Robert M. Elliott
Attorney—Gravely, Lieder & Woodruff

[57] ABSTRACT

The invention comprises a process for producing a folded egg omelet using an egg batter mixture. The mixture is deposited into a preheated omelet cooking pan which has hinged sides which are folded upwardly together after partial cooking of the omelet. The omelet batter is deposited into the preheated foldable pan and is heated from the top and from the bottom. After direct heating is terminated, flavoring ingredients or inclusions are deposited onto the partially cooked omelet and $CO_2$ and steam are allowed to escape before the pan is closed. The omelet while folded continues to cook from the residual heat in the omelet cooking pan.

5 Claims, 7 Drawing Figures

INVENTORS
S. DUANE LATHAM
ROBERT D. SEELEY
HENRY F. REITZ
RONALD F. REITZ

BY Gravely, Lieder & Woodruff
ATTORNEYS

OMELET PREPARING AND PROCESS

BACKGROUND OF THE INVENTION

This application contains subject matter in common with co-pending application Ser. No. 80,125, filed Oct. 12, 1970 entitled EGG COMPOSITION by S. Duane Latham and Robert D. Seeley. In that application the composition of the egg mix is completely described. Also, some of the background of the problem concerning preparing frozen cooked egg omelets is discussed. Briefly, it has not heretofore been possible to produce a completely cooked frozen omelet which can be prepared, frozen, and packaged for institutional use or consumer consumption. Some of the problems have involved the composition itself and also undesireable characteristics of the resulting product. However, it has been difficult to provide a machine and process for cooking an omelet which maintains its raised position and which can be cooked on an assembly line basis without substantial hand labor. The present invention comprises a machine which cooks the omelet and discharges a completely cooked omelet. The omelet is ready for immediate consumption. However, usually the omelet is rapidly frozen, packaged, and shipped to the ultimate user. The user will thaw the omelet, reheat it, and then serve it to the ultimate consumer. It may be kept on a steam table or other suitable warming devices in either type of use.

The egg composition hereinafter described in detail is particularly useful in precooked frozen omelets and the description relates specifically to such use. However, the invention can be utilized in the production of a frozen uncooked batter, or it can be utilized by allowing the chef to mix the ingredients himself.

From about 60 percent to about 80 percent whole egg and from about five percent to about 25 percent added water by weight are used. Whole fresh eggs, frozen egg and reconstituted egg can be used in the composition. The preferred product uses frozen whole egg. In this formulation about 70 percent whole egg and about 15 percent added water are used. The additional water is for the purpose of replacing water lost during cooking, thus reducing dryness and improving the eating quality of the product. The eggs are pasteurized to prevent spoilage.

The potato flour and non-fat milk solids are added to improve water holding capacity and to improve eating quality. These additives make the egg feel soft and creamy in the mouth. Up to about four percent potato flour and up to about three percent non-fat milk solids can be used. These percentages are by weight of the final egg composition. In addition to potato flour other suitable carbohydrates, such as, corn starch, rice flour, wheat flour, pregelatinized wheat starch, pregelatinized tapioca starch and pregelatinized potato starch can be used in whole or in part as a substitute. Liquid or dried skim milk, liquid or dried whole milk and non-dairy milk substitutes can be substituted for all or part of the non-fat milk solids.

From about 0.05 percent to about 0.20 percent citric acid is added to improve cooked egg color. The citric acid brightens the yellow color of egg products and retards ferrous sulfide greening that often occurs when eggs are held at steam table temperature over extended periods. Other edible acids or acid salts, such as malic, fumaric, lactic or monosodium phosphate can be substituted for all or part of the citric acid.

The carboxymethyl cellulose (CMC) is used as a thickening agent in the uncooked omelet batter which aids in suspending added ingredients. Other common thickening agents, such as alginates, carrageenin, locust bean, guar and cellulose gums, may be used for this viscosity control.

The other cellulose gum derivatives, namely hydroxypropyl cellulose (Klucel) and methyl cellulose (Methocel) are thermosetting gums. Klucel is a trademark of Hercules Incorporated and Methocel is a trademark of The Dow Chemical Company. Although Methocel HG 90 15,000 and Klucel LF yield the most satisfactory results, other types of Methocel and Klucel may be substituted. These other two gums (Methocel and Klucel) are used to give strength to the coagulated egg protein structure during the cooling process after cooking. This results in an increased stability of omelet shape and volume after removal from the cooking untensil and upon cooling. Omelets cooked without the presence of these cellulose gums shrink very rapidly when cooled, thus lacking volume and eye appeal. When one or more of these gums are removed from the composition, decreased volume of the cooked omelet product results. Thus the combination of gums is important. The reason for this increased volume stability is probably because the cold water soluble cellulose gum derivatives intimately associate with the egg proteins before cooking. During cooking the egg proteins coagulate, and the hydroxypropyl cellulose becomes insoluble and the methyl cellulose gels. The coagulated protein is believed to associate with the insoluble and gelled gums, thus increasing the strength of the protein fiber during the cooling period. When the cooked product is cooled the hydroxypropyl cellulose redissolves and the methyl cellulose gel disaccociates. But at the cooled temperature the egg proteins have sufficient strength to maintain the cooked omelet shape and volume. Other compounds having properties similar to hydroxypropyl cellulose and methyl cellulose will function similarly in this composition. Other gum-like materials that do not become insoluble and/or gel at temperatures between 100–200° F. do not act in this composition in the same fashion or achieve the same results as the aforementioned gums. The hydroxypropyl cellulose and methyl cellulose also act to increase the viscosity of the batter. All of the cellulose gums reduce syneresis which often results from freezing and thawing products.

From about 0.10 percent to about 0.5 percent hydroxypropyl cellulose and from about 0.05 percent to about 0.45 percent by weight methyl cellulose are added to the egg composition. From about 0.07 percent to about 0.15 percent carboxymethyl cellulose is added.

These gums are identified as thermosetting and for purposes of this invention thermosetting and heat precipitable gums, i.e., gums which gel or precipitate at about 100–200° F., are satisfactory.

From about 0.03 percent to about 0.10 percent by weight ethoxylated monoglyceride (EMG) is added to soften and tenderize the omelet. Higher amounts do not detract from the eating quality of the product but do not improve it measurably. Omelets containing the cellulose gums alone are slightly hard and mealy when compared with those containing the cellulose gums plus EMG. Taste panel results indicate this tenderizing effect is a meaningful improvement. While EMG has been used previously in bakery products, it has not been used in precooked egg products.

The egg omelet formulation uses a chemical leavening system which includes from about 0.40 percent to about 1.5 percent sodium bicarbonate and an amount of leavening acid sufficient to neutralize the sodium bicarbonate. Preferably this leavening acid is sodium aluminum phosphate (Levair) which is used on a one to one eight basis. The chemical leavening system is used to increase the volume of the omelet during the cooking process. The chemical leavening of commercial egg products of this type is new as conventional omelets are whipped into loose volume before cooking. The chemical leavening system adds volume to the omelet mix during cooking and holds this volume on cooling. The increase in volume is about 40–50 percent.

For best results the chemical leavening should be of the type which gives off some $CO_2$ on mixing of the ingredients, some on standing, and some on heating. This results in a fluffy final cooked omelet. In mixing and cooking the omelet it is important for optimum quality that no more than about 90 minutes elapse between mixing stops and cooking starts. If substantially more time elapses, the action of the chemical leavening will be dissipated before cooking starts and an unsatisfactory omelet may result.

A small but effective amount of salt and pepper is used in the formulation strictly as seasonings.

The formulation as shown in Table 1 may be modified to incorporate various flavoring ingredients or adjuncts to form various flavor varieties. These include meats, cheeses, peppers, mushrooms, and other conventional omelet additives. Up to about 50 percent flavoring ingredients can be added to the base formulation.

Example I. Optimum Plain Omelet Formulation

| Ingredients | % |
|---|---|
| Whole Egg | 79.89 |
| Water | 14.82 |
| Potato Flour | 1.56 |
| N.F.M.S. | 1.09 |
| Citric Acid | 0.05 |
| Carboxymethyl Cellulose (CMC) | 0.08 |
| Hydroxypropyl Cellulose (Klucel-LF) | 0.15 |
| Methocel 90 HG 15,000 | 0.10 |
| Ethoxylated Monoglyceride (EMG) | 0.05 |
| Sodium Bicarbonate | 0.75 |
| Sodium aluminum Phosphate (Levair) | 0.75 |
| Salt | 0.65 |
| Black Pepper | 0.06 |
| | 100% |

The foregoing preparation is made as follows: The egg is placed in a Waring Blendor or any other suitable mixer along with the added water and dissolved EMG. A small portion of the added water is heated and used to dissolve the EMG. The dry ingredients, except for the leavening system and seasoning are weighed and mixed together. The mixer is started and the speed adjusted to create a vortex. The dry ingredients are slowly sifted into the vortex. A total of about 2 minutes mixing is sufficient. For optimum viscosity development and omelet quality this mixture is held at refrigerated temperature for about 15 to 20 minutes. After this time the leavening and seasoning are added by mixing as described above for the dry ingredients. The resulting omelet batter is again held at refrigerated temperature for 15–20 minutes before cooking the omelets. The leavening and seasoning may be added with the dry ingredients and the hold periods reduced or eliminated, however, optimum quality is not achieved.

SUMMARY OF THE INVENTION

Thus, it is a main object of the present invention to provide a machine and process for preparing an omelet which can be consumed immediately after cooking or which can be cooked, frozen and packaged for later thawing, heating and ultimate consumption. Other objects and advantages will become apparent hereinafter.

The present invention comprises a machine for continuouslu cooking omelets and also comprises a process for making omelets which can be frozen and later thawed and reheated for ultimate consumption. The present invention further comprises the apparatus and process hereafter described and claimed.

DESCRIPTION OF THE DRAWINGS

In the drawings wherein like numbers refer to like parts wherever they occur.

DETAILED DESCRIPTION

Figure 1:
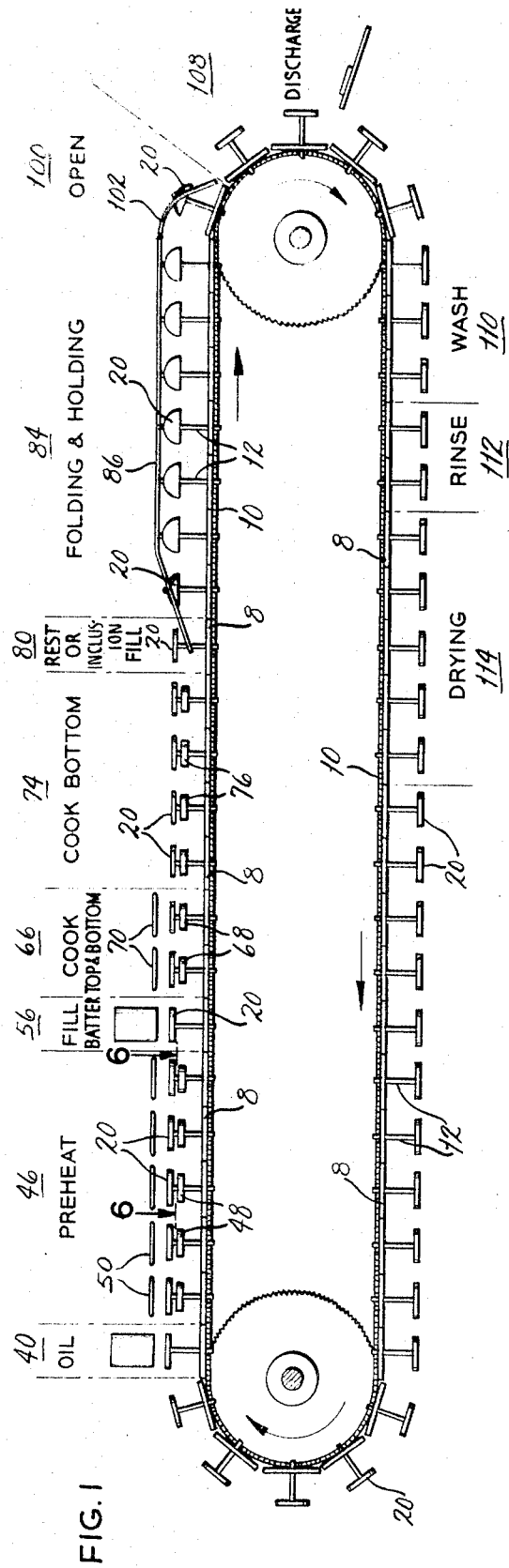
FIG. 1 is a side elevational view of an omelet cooking machine constructed in accordance with and embodying the present invention showing portions of the ancillary apparatus and the process schematically.

Referring now to the drawings, the numeral 2 designated an omelet cooking machine including a frame 4 provided with a track or ways 6 along which a succession of carriages 8 move. The carriages 8 are propelled by an endless conveyor chain 10 (FIG. 1) connected with a suitable drive mechanism and each carriage 8 includes (FIG. 2) an upstanding pedestal 12, the width of which is quite narrow in the direction transverse of the ways 6. The pedestal 12 is jointed (FIG. 3) so that the pan 20 can be quickly removed and exchanged. At its upper end the pedestal 12 supports a cooking pan 20 which is advanced incrementally past several stations on the frame 4 as will hereinafter be explained.

The pan 20 is preferably formed from stainless steel or any suitable food grade material and includes (FIGS. 2-5) a center section 22 and a pair of side sections 24 and 26 which fold relative to the center section 22. The center section 22 is welded or otherwise rigidly secured to the upper end of the pedestal 12 on the carriage 8. It is generally rectangular in shape, having its longitudinal axis extending in the direction of the ways 6, and at its ends it is provided with butting plates 27 and upstanding tabs 28.

Figure 5:
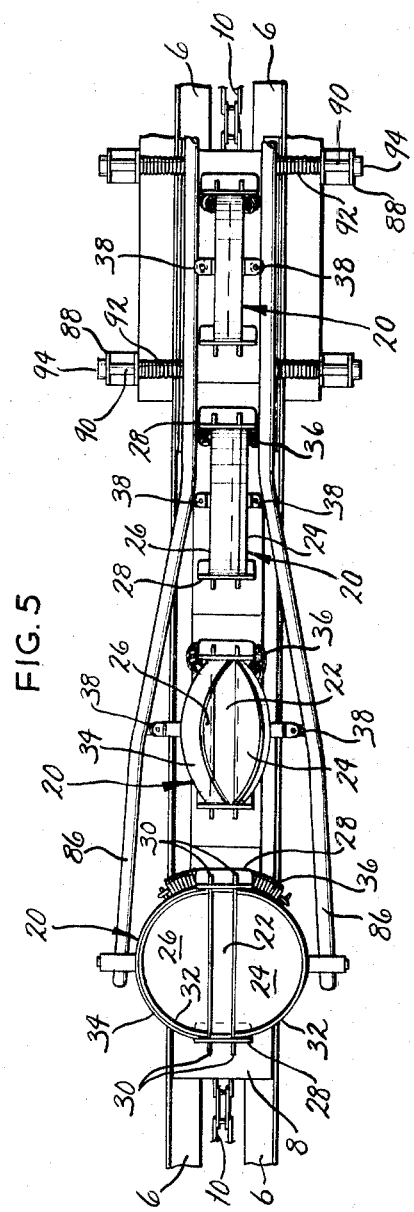
FIG. 5 is a fragmentary plan view of the machine, the view showing a succession of pans along the cam rails which move the pans into their closed position.
Figure 2:
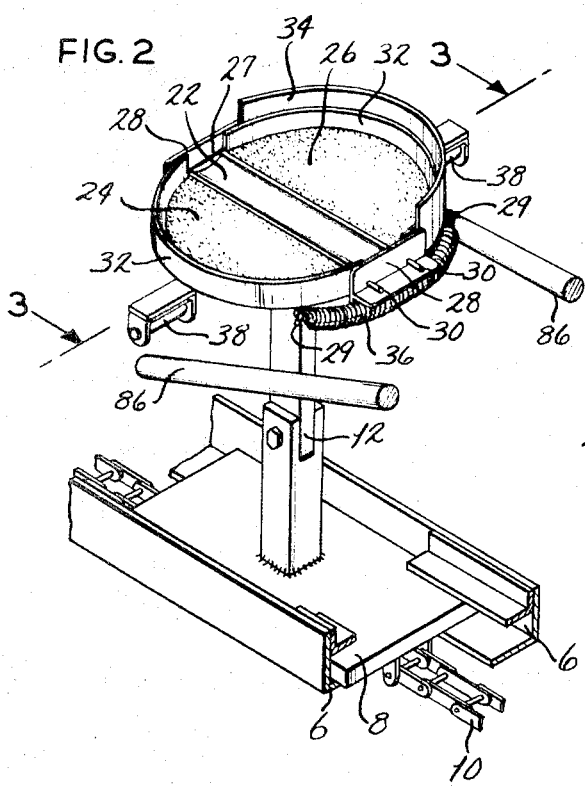
FIG. 2 is a perspective view of a folding pan constructed in accordance with and embodying the present invention.
Figure 3:
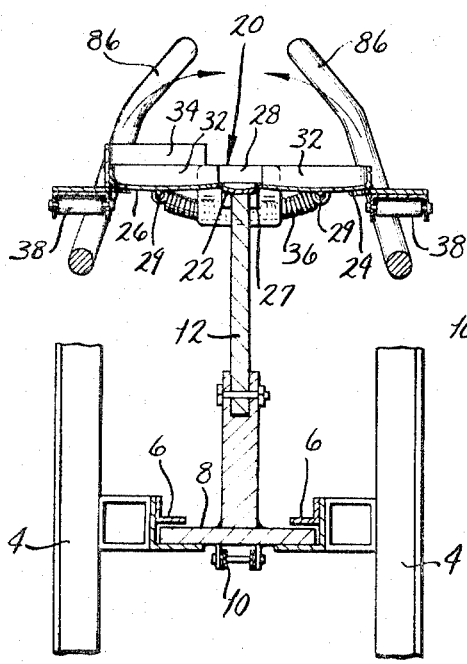
FIG. 3 is a sectional view taken along line 3—3 of FIG. 2 and showing the pan in its open position.
Figure 7:
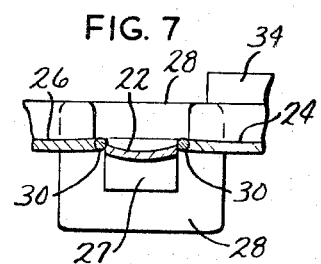
FIG. 7 is an enlarged fragmentary sectional view of the pan showing the position of the hinge pins therein.

The sides 24 and 26 are formed with a slight depression into a concave shape of about 1/8 inch depth to give the omelet a more rounded external appearance. Similarly the center section 22 is curved to carry through the rounded omelet shape. The depth of the curve in the section 22 is about 1/8 inch. The side section 24 and 26 preferably are somewhat semicricular (FIGS. 2 and 5), or more accurately chordal in shape, and they are hinged with respect to the center section 22 by hinge pins 30 which extend outwardly therefrom as a continuation of their chordal margins. Other shapes can be used, if desired. The pins 30 project across the side edges of the butting plates 27 at the upper ends thereof (FIG. 7) and further project through the upstanding tabs 28, enabling the side sections 24 and 26 to swing upwardly relative to the center section 22. The hinge pins 30 are positioned (FIG. 7) such that their centers are on a plane aligned with the uppermost edges of the center section 22. This prevents egg batter from being trapped between the center section 22 and the side sections 24 and 26 when the pan 20 is closed to fold the omelet. When the omelet batter is trapped as described above, a fringe of coagulated batter is formed along the folded margins of the omelet. Along their arcuate margins the side sections 24 and 26 are provided with arcuate shaped edges or rims 32, the ends of which are set slightly inwardly from the inside faces of the tabs 28 and in alignment with the upper edges of the butting plates 27 (FIGS. 2 and 5). In addition, the rim 32 on side section 26 is backed by an arcuate closure lip 34 which projects upwardly beyond that rim 32 and extends through a slightly shorter arc so that the ends of the lip 34 are set inwardly from the ends of the rim 32 to which it is attached.

The pan 20 folds from an open position (FIGS. 2 and 3) wherein batter may be deposited in it to a closed position (FIG. 4) wherein the cooked or partially cooked batter is folded upon itself. In the open position the pan sections 22, 24 and 26 form an upwardly presented surface of circular shape, and this surface is bounded by a containing or side wall formed by the arcuate rims 32 on the side sections 24 and 26 and the upstanding tabs 28 on the center section 22. The junctures of the rims 32 and the bottoms of the pans 24 and 26 are slightly rounded to give the omelet a rounded edge. In the folded position the side sections 24 and 26 are presented perpendicular to the center section 22 and the semicircular margins of the arcuate rims 32 on those side sections abut, but the abutting margins are obscured by the arcuate lip 34 which overlies them. The end margins of the rims 32, on the other hand, abut the upper edges of the butting plates 27 when the side sections 24 and 26 are fully closed. To facilitate closure and to obtain a realtively tight fit along the sides of the closed side sections 24 and 26 the opposed surfaces on the lip 34 and the rim 32 of the side section 24 should be slightly beveled.

The pan 20 is urged to its open position by means of a tension spring 36 which extends under the center section 22 and behind the tab 28. At its ends the spring 36 attaches to rods 29 fixed to the side sections 24 and 26. Moreover, each side section 24 and 26 has a roller follower 38 (FIGS. 2-5) located outwardly from its arucate rim 32, and the axis of rotation for each roller follower 38 extends in a direction generally parallel to the chordal surface of the section 24 or 26 and perpendicular to the axis of the hinge pins 30.

The conveypr chain 10 has an upper and a lower pass and it draws the carriage 8 along the ways 6. The carriage 8 in turn moves the pan 20 past several stations (FIG. 1) at which various operations necessary for the production of an omelet take place. The movement is incremental so the pan 20 comes to rest at least once at each station. These stations and the equipment associated with them are as follows:

At the very outset the pan 20 is located in its open position at an oiling station 40 disposed at the beginning of the upper pass for the chain 10. At this station a metered quantity of cooking oil or some other suitable release agent is deposited on the upper surface formed by the center segment 22 and the side segments 24 and 26 of the open pan 20. The station 40 can be eliminated if the pan 20 is constructed with a material coated with a compound such as Teflon which will prevent the omelet from sticking to the pan 20.

Figure 6:
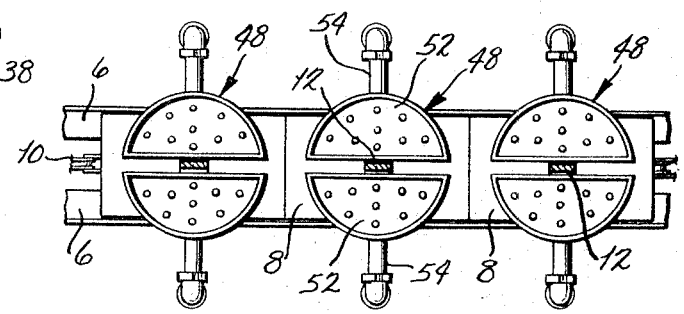
FIG. 6 is a sectional view taken along line 6—6 of FIG. 1 and showing the D-shaped burner segments.

Next the conveyor chain 10 advances the carriage 8 to a preheat station 46 including a succession of gas or electrical burners 48 and electrical heating coils 50. At this station the open pan 20 is heated to a surface temperature between about 250° and 300° F. for best results. The electrical coils 50 are disposed over the path along which the pan 20 is propelled, and those coils 50 radiate heat to the flat upper surfaces of the pan sections 22, 24 and 26, thereby raising the temperature of the pan 20. The gas or electric burners 48, on the other hand, are disposed beneath the path traversed by the pan 20. Each burner 48 includes (FIG. 6) D-shaped or semicircular segments 52 which are very similar in shape to the side sections 24 and 26 of the pan 20. These burner segments 52 are supported on the frame 4 by gas supply pipes 54 or other suitable means such that their arcuate sides are presented outwardly away from each other while their straight or chordal sides are presented toward each other, yet are spaced slightly apart. The narrow space between the straight sides of the burner segments 52 extends in the same direction as the ways 6 and is wide enough to accommodate the pedestal 12 as the carriage 8 is advanced along the ways 6. Preheating may be accomplished by the lower burners 48 alone, but more stations may be required. Other types of heating can be used if desired.

After the preheat station 46, the open pan 20 arrives at a batter filling station 56 including a large container filled with a suitable omelet batter such as the batter disclosed in the co-pending application of S. Duane Latham and Robert D. Seeley entitled EGG COMPOSITION. The batter passes through a metering device before flowing into the pan 20 so that the pan 20 receives the proper amount of batter. Upon entering the pan 20 the batter flows across the composite upper surface formed by the pan sections 22, 24 and 26 and is prevented from flowing off of that surface by the arcuate rims 32 on the side sections 24 and 26 and the upstanding end tabs 28 on the center section 22. Since the pan 20 is already preheated to between about 250° and 300° F. the batter begins to cook immediately. If the pan 20 is not preheated to sufficiently high temperature the omelet batter will leak out of the pan through the cracks between the center section 22 and the side sections 24 and 26. When the pan 20 is preheated to between about 250–300° F. the omelet batter will start to coagulate immediately, filling the cracks and preventing leakage.

The next incremental movement of the carriage 8 brings the pan 20 to a first cooking station 66 including a succession of burners 68 located below the path of the open pan 20 and an equal number of electrical heating elements 70 located above the path of the open pan 20. The burners 68 and electrical heating elements 70 are both supported on the frame 4 and are similar in construction respectively to the burners 48 and the heating elements 50. Accordingly, each burner 68 includes two semicircular segments which are spaced apart sufficiently to enable the pedestal 12 to pass between them. The purpose of the overhead heating elements 70 at the station 66 is to coagulate a thin film of omelet batter on the upper surface of the cooking omelet. This film is much like that on the surface of meringue, but without browning. This retards the uncooked portion of the omelet batter from flowing from the side area to the center area during the floding process of station 84.

After leaving the first cooking station 66 the open pan 20 arrives at a second cooking station 74 where the batter continues to cook. In this station, however, the heat for cooking the batter is supplied only from beneath the pan 20. In particular, this station has a plurality of segmented burners 76 mounted on the frame such that each incremental advance will bring the pan over a different burner 76. The burners 76 are similar to the burners 48 and 68 and therefore will not be described in detail.

During the trip through station 66 and 74, the chemical leavening agent has been releasing $CO_2$ and the omelet has been raising. Beyond the second cooking station 74 is a rest station 80 where the pan 20 and omelet are left undisturbed, except for perhaps the introduction of inclusions into it. These inclusions may be bacon, mushrooms, cheese, ham, vegetables, or any other ingredients which are normally introduced into omelets. The purpose for leaving the partially cooked omelet undisturbed at the rest station 80 is to enable any steam or carbon dioxide which may be trapped inside the partially cooked omelet batter to escape. If the steam and/or $CO_2$ did not escape, it would be trapped when the pan sides 24 and 26 are later closed. This could cause a pressure build-up inside the omelet which would explode the omelet when the pan sides are later opened to discharge the completely cooked omelet. The time for which the pan 20 is in station 80 depends upon the time necessary for the gases to evolve from within the partially cooked batter. The time can be reduced by creating a lower pressure atmosphere at this station (80) of the process.

Figure 4:
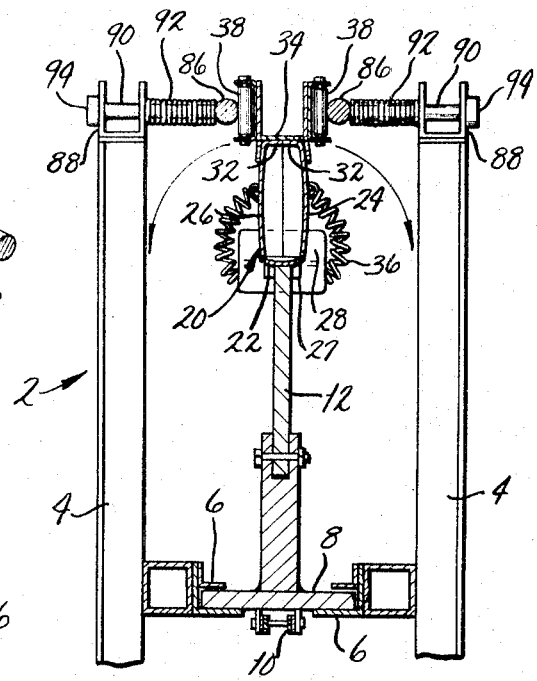
FIG. 4 is a sectional view similar to FIG. 3; but showing the pan in its closed position.

After the rest station 80 the pan 20 enters a folding station 84 wherein its side sections 24 and 26 are folded (FIGS. 1 and 5) into their closed position as the pan 20 is incrementally advanced. In particular, the folding station 84 includes a pair of cam rails 86 which are supported on the frame 4 by fixed mounting bracket 88. The lead ends of the rails 86 are spaced apart a distance equal to the spacing between the roller followers 38 when the pan 20 is in its open position (FIGS. 2 and 3), but are located below those roller followers 38. Beyond their lead ends, the rails 86 converge and are furthermore inclined gently upwardly (FIGS. 3 and 5) so that as the pan 20 is advanced, its roller followers 38 will engage the rails 86 and move the side sections 24 and 26 toward the closed position (FIGS. 4 and 5). The relationship between the upward inclination and the convergence of the rails 86 is such that the roller followers 38 remain continuously engaged with those rails 86. Near their terminal ends the cam rails 86 are horizontal and parallel, the spacing between them generally equaling the spacing between the roller followers 38 when the pan 20 is in its closed position. Consequently, as the pan 20 passes through the portion of the folding station 84 at which the rails 86 are parallel, its side sections 24 and 26 will be held in the closed position (FIG. 4) against the opening force exerted by the spring 36.

Moreover, at their parallel portions the cam rails 86 are provided with laterally extending support rods 90 (FIGS. 4 and 5) which are welded or otherwise rigidly fastened thereto. These rods 90 extend through and are axially shiftable in the mounting brackets 88 which are fastened to the frame 4. The rods 90 also extend through coil compression springs 92 which are interposed between mounting brackets 88 and the cam rails 86 for urging the rails 86 inwardly or toward one another. On the outer sides of the mounting brackets 88 the rods 90 are fitted with stops 94 to hold them in the brackets 88 and to properly position the two rails 86 relative to each other. The springs 92 yield slightly when the roller followers 38 move onto the parallel sections of the cam rails 86 (FIGS. 4 and 5), thereby assuring that the side sections 24 and 26 are brought completely together. Conversely, the rails 86 may be fixed and the roller followers 38 may be spring loaded to bear against the rails 86.

Thus, as the pan 20 advances through the folding and holding station 84, its side segments 24 and 26 move toward and eventually into the closed position, in which case they face each other with their arcuate rims 32 in juxtaposition. In other words, they are presented perpendicular to the center section 22. During the transition, the partially cooked batter in the pan 20 is also folded upon itself and any inclusions are retained within and completely covered by the batter.

The residual heat in the cooking pan 20 continues to cook the batter as the roller followers 38 move along the cam rails 86 and swing the side segments 24 and 26 toward one another. However, by the time the pan 20 reaches the terminal ends of the rails 86 the batter within it is completely cooked and forms a complete omelet. By utilizing the heat stored in the omelet pan 20 to complete the cooking after folding, a lighter colored external surface of the omelet can be obtained. Overly browned omelets are obtained when too much direct heat is applied to the pan 20.

Continued advancement of the carriage 8 brings the cooking pan 20 to an opening station 100 including diverging and declining guide rails 102 (FIG. 1) which align with and are engaged by the roller followers 38. In particular, once the roller followers 38 leave the terminal ends of the spring loaded cam rails 86, they pass onto the leading ends of the guide rails 102, since the guide rails 102 diverge and decline beyond their leading ends, the spring 36 on the pan 20 swings the side segments 24 and 26 of the pan 20 away from each other, eventually bringing them to their open position and exposing the completed omelet.

Next the cooking pan 20 moves past a discharge station 108 where the completed omelet is deposited on another conveyor or a chute for subsequent processing, freezing and packaging. This station is located along the transition between the terminal end of the upper pass and the leading end of the lower pass for the chain 10, so that the cooked omelet merely falls from the pan 20.

The empty pan 20 then moves through a wash station 110 in its open condition where a spray of detergent and water cleans the pan 20. Finally, the pan 20 moves to a rinse station 112 where the wash water is rinsed away. As one means of drying the pan, the escaping heat from the preheating and cooking sections may be directed and used to dry the washed and rinsed pan 20 (Station 114).

The omelet cooking machine 2 may be shortened considerably by curving the parallel portions of the cam rails around the transition between the upper and lower passes of the conveyor chain 10. In that case the folding and holding station 84 would be located along the upper pass, around the transition and perhaps along the lower pass. The discharge station 108 would be located along the lower pass.

In summary, the process for preparing an omelet involves the following: First the upper surface of the cooking pan 20 is oiled or otherwise treated with a release agent (station 40). Then the pan 20 is preheated to between about 250° and 300° F. by passing it between the gas or electric burners 48 and the overhead electrical heating elements 50 (station 46). Next, omelet batter is introduced into the oiled and preheated pan 20 (station 56). Thereafter, the batter is cooked, first by passing the pan 20 over underlying burners 68 and under overhead heating elements 70 (station 66), and then by passing it over underlying burners 76 only (station 74). Then the partially cooked batter is left undisturbed (station 80) to enable gases evolved during cooking, namely steam and carbon dioxide to escape therefrom so that when it is subsequently folded no significant amount of gases will be trapped. This prevents the cooked omelet from exploding once the pan 20 is opened at station 100. Inclusions may also be incorporated into the batter at the station 80. Next the side sections 24 and 26 of the cooking pan 20 are moved to their closed position, thereby folding the omelet. The pan 20 is held in its folded position for a while (station 84) to complete the cooking of the omelet. Thereafter, the pan 20 is allowed to open under the force exerted by the spring 36 (station 100), exposing the completed omelet. This completed omelet is discharged from the pan 20 (station 108) and the pan 20 is washed (station 110), rinsed (station 112), and dried (station 113).

By the way of example, the oiled cooking pan 20 should be preheated to a surface temperature of between 250° to 300° F. at the preheat station 46, and once filled with batter, that batter should be cooked at the first cooking station 66 for one minute at 225° to 250° F. and at the second cooking station 74 for 2 minutes at 225° to 250° F. The partially cooked batter should be left undisturbed at the rest station 80 for ½ minute. After the rest station the cooking pan 20 should be brought to its closed position along the rails 86 within ½ minute, and should be held in the closed position, that is between the parallel and horizontal portions of the cam rails 86 for 3 minutes. The time at the processing stations are varied by adjusting the heat intensity of both the underlying burners and the overhead electrical coil elements. The sequence shown here is one that produced an optimum quality omelet.

The machine 2 and the process employed by it are designed for preparing omelets in mass quantities for institutional or commercial use or for use by food processors who subsequently freeze or otherwise preserve the omelets until they are again heated. To this end a succession of carriages 8 and cooking pans 20 are normally connected to the chain 10, each spaced an equal distance apart. As previously noted the chain 10 is endless and is divided into upper and lower passes. The stations 40, 46, 56, 66, 74, 80 and 84 are all along the upper pass to retain the cooking oil, batter, and omelet in the pane 20. The discharge station 108, on the other hand, is at the transition between the passes so that the completed omelet merely falls from the pan 20. The wash, rinse, and dry stations 110, 112 and 114 are located along the lower pass so that the wash and rinse water will drain from the pans 20 after they leave these staions.

The chain 10 is advanced incrementally, and each incremental advance is equal in length and equal to the distance between successive stations or components of a single station. For example, a single incremental advance will bring one pan 20 from the oiling station 40 to the preheat station 46, while another pan 20 further along the upper pass will move from the rest station 80 to the folding station 84. During the same incremental movement several pans 20 at the preheat station 46 will merely shift from one set of burners 48 and electrical heating elements 50 to another subsequent set. Similarly, in the folding and holding station 84 most of the pans 20 remain folded and move from one position along the parallel portions of the cam rails 86 to a subsequent position.

If the incremental advances occur every 30 seconds then 5 sets of burners 48 and electrical heating elements 50 will be required in the preheat station, for 2 ½ minutes of preheating; 2 sets of burners 68 and electrical heating elements 70 will be required at the first cooking station 66 for 1 minute of cooking; and 4 burners 76 will be required at the second cooking station 74 for 2 additional minutes of cooking.

This invention is intended to cover all changes and modifications of the example of the invention herein chosen for purposes of the disclosure which do not constitute departures from the spirit and scope of the invention.

What is claimed is:

1. A process for making an omelet comprising the steps of:
   A. preheating a foldable pan,
   B. depositing a selected charge of a fluid egg based mix into the pan, said mix containing a chemical leavening system capable of generating gas,
   C. applying heat to the bottom of the pan,
   D. applying heat directly to the top surface of the mix,
   E. continuing the heat applications of steps C and D for a time sufficient only partially to cook the mix while coagulating a skin on the top surface of the mix to retard the uncooked portion of the mix from flowing from the side area to the center area during subsequent folding, and then terminating said heat applications,
   F. resting the partially cooked mix to allow escape of generated gas and steam which may be trapped inside the partially cooked mix, and then
   G. completing the cooking of the mix through residual heat in the pan by bringing the sides of the pan together to form the omelet.

2. The process of claim 1 wherein step D is terminated before step C is terminated.

3. The process of claim 1 including the step of adding a filling to the omelet after heating and before the sides of the pan are closed.

4. The process of claim 1 including the step of lubricating and preheating the pan prior to depositing the omelet mix therein.

5. The process of claim 1 including the step of opening the pan sides after the omelet has cooked to discharge the cooked omelet from the pan.

* * * * *